United States Patent [19]

Oetting

[11] Patent Number: 4,710,563
[45] Date of Patent: Dec. 1, 1987

[54] PROCESS FOR THE RECOVERY OF AMORPHOUS DEVAPORIZED POLYALPHAOLEFIN

[75] Inventor: Steven L. Oetting, Midland, Tex.

[73] Assignee: El Paso Products Company, Odessa, Tex.

[21] Appl. No.: 896,793

[22] Filed: Aug. 15, 1986

[51] Int. Cl.$^4$ ............................. C08F 6/26; C08F 6/28
[52] U.S. Cl. ..................................... 528/501; 528/481;
528/503; 526/68; 526/902
[58] Field of Search .................. 523/340, 343; 526/67,
526/88, 902, 68, 351; 528/481, 501, 503;
585/832

[56] References Cited

U.S. PATENT DOCUMENTS

| | | | |
|---|---|---|---|
| 4,184,027 | 1/1980 | Hopkins | 526/68 X |
| 4,208,530 | 6/1980 | Matsuyama | 528/501 |
| 4,209,599 | 6/1980 | Brady et al. | 526/68 X |
| 4,407,989 | 10/1983 | Takao et al. | 523/340 |

Primary Examiner—Joseph L. Schofer
Assistant Examiner—F. M. Teskin
Attorney, Agent, or Firm—Fred S. Valles; Margareta LeMaire

[57] ABSTRACT

A circulation loop is provided between a point next to the outlet of an amorphous polyalphaolefin polymerization zone and a flash zone, carrying a stream of molten devaporized polymer product.

3 Claims, 1 Drawing Figure

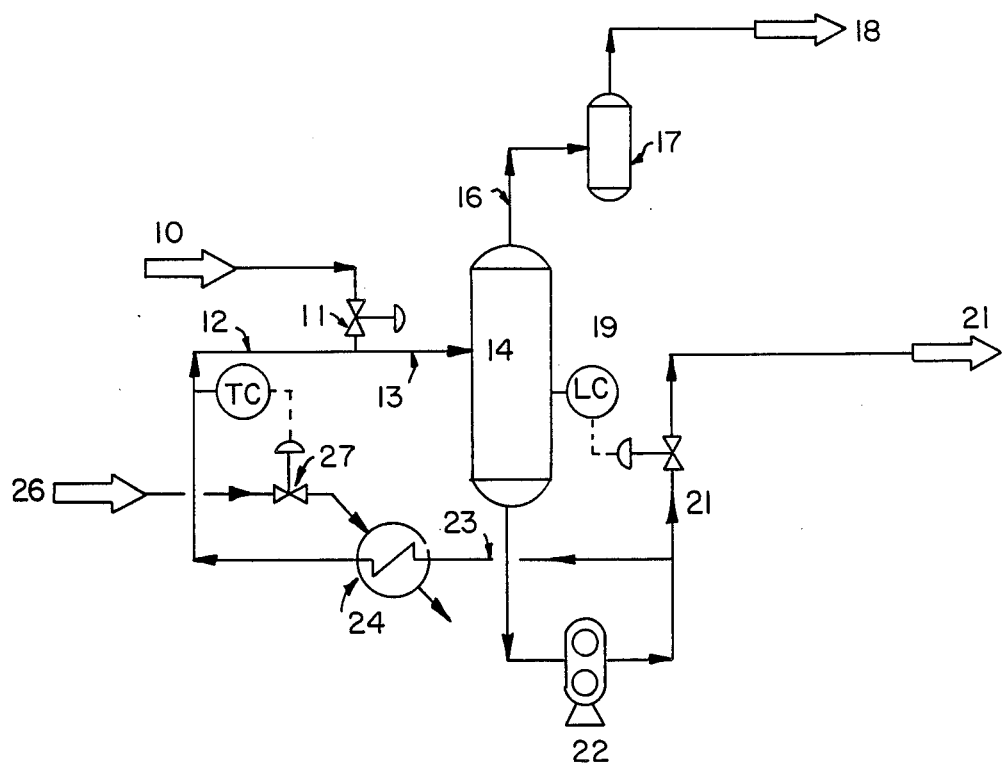

PROCESS FOR THE RECOVERY OF AMORPHOUS DEVAPORIZED POLYALPHAOLEFIN

BACKGROUND OF THE INVENTION

The present invention relates to a bulk polymerization process at elevated temperatures and pressures for the direct production of substantially amorphous polyalphaolefins using a high activity supported catalyst system and more particularly to a process for the production of an amorphous propylene homopolymer, amorphous copolymers of propylene and ethylene, or amorphous interpolymers of propylene, ethylene and another alpha-olefin having from 4 to 8 carbon atoms per molecule. The amorphous polymer is the only product of the process and after separation of unreacted monomers, deactivation of catalyst residues in the polymer and polymer stabilization against heat and oxidation, the final product is recovered from the process.

The amorphous polyalphaolefin leaves the polymerization reactor as a 30–60% solution in liquid propylene, usually at temperatures in the range of 130° F. and 175° F. and at pressures between about 400 psig and about 550 psig. In conventional slurry polymerization processes for the production of highly crystalline isotactic propylene polymer, the reactor effluent is merely passed to a vaporization zone, usually a cyclone-bag filter combination, maintained at relatively low pressure, in which zone separation or flashing of unreacted propylene monomer occurs overhead while solid and substantially dry and free flowing polymer in powder form is recovered from the bottoms of the vaporization zone. Such an arrangement is completely unsuitable in an amorphous polyalphaolefin process due to the physical characteristics of the polymer product, i.e. the high viscosity and "stickiness" which will prevent it from being recovered as a powder solid on a nonplugging filter.

In addition, due to the inherent lowering in temperature in a flashing operation at reduced pressure, the product stream removed from the reactor will freeze and plug the conduits leading to the vaporization zone.

It is therefore an object of the present invention to provide an improved process for the separation of the amorphous polyalphaolefin from unreacted monomer(s).

It is another object of the invention to provide a process for the recovery of amorphous polyalphaolefin product in fluid form.

Further objects of the invention will become apparent from the detailed description of the invention.

DESCRIPTION OF THE DRAWING

The FIGURE is a schematic flow diagram of one embodiment of the process of this invention.

THE INVENTION

In accordance with the present invention there is provided a process for the direct production of a polyalphaolefin in fluid form which comprises:

(a) withdrawing from a bulk polymerization zone maintained at a temperature between about 130° F. and about 175° F. and at a pressure between about 400 psig and about 550 psig through a valve a reactor effluent comprised of amorphous polyalphaolefin and liquid unreacted monomer;

(b) directly contacting said effluent immediately upon withdrawal through said valve with a heated devaporized amorphous polyalphaolefin obtained in step (f) below and having a temperature in the range from about 350° F. to about 425° F.;

(c) passing the resulting mixture from step (b) to a flash zone maintained at a pressure from about 40 to about 80 psig and a temperature between about 300° F. and about 375° F.;

(d) withdrawing a vapor stream of unreacted monomer from said flash zone;

(e) withdrawing devaporized amorphous polyalphaolefin from said flash zone, and (f) heating a portion of said devaporized polyalphaolefin from step (e) by indirect heat exchange and passing the heated portion to step (b) above.

It is not important to the success of the present invention what bulk polymerization conditions and catalyst system are chosen in the preparation of the amorphous polyalphaolefin. Nor is it important whether the polymer is a homopolymer or a copolymer. However, one particularly advantageous process for the production of such amorphous polyalphaolefins is disclosed in U.S. patent application Ser. No. 880,456, filed June 30, 1986, hereby incorporated by reference into this application.

The polymer products of the process of this invention have excellent properties making them useful in a variety of applications, such as for adhesives, caulking and sealing compounds, roofing compositions and others.

For a better understanding of the invention, reference is had to the accompanying drawing which depicts one exemplifying embodiment of the claimed process. A reactor effluent containing an amorphous copolymer of a major proportion of propylene with ethylene as the remainder, e.g. about 85 wt % propylene and 15 wt % ethylene, is provided in line 10. The effluent also containing typically from about 40 to about 70 wt % of unreacted monomers and hydrogen used for molecular weight control, is passed through a cyclic discharge valve or "blipper" valve 11, which is of the type that opens and closes continuously so that the effluent withdrawn from the polymerization vessel (not shown) simulates a continuous discharge operation. The effluent is subsequently heated as close as possible to the outlet of the "blipper" valve 11, by means of intermixing of molten amorphous polymer from line 12 having a temperature between about 350° F. and about 425° F. The weight ratio of amorphous polyolefins in line 12 and line 10 (monomer free basis) should range between about 10:1 and about 15:1.

The mixed stream 13 is introduced into a flash tank 14 maintained at a pressure ranging between about 40 and about 80 psig. Unreacted monomer vapors (and also small quantities of hydrogen used as a polymer molecular weight control agent) flow from flash tank 14 via line 16 through a separator 17 to remove small amounts of entrained polymer and then to purification and recycle to the polymerization reactor (not shown). Devaporized polymer is withdrawn in line 21 and the net polymer product having a temperature between 300° F. and 375° F. flows by means of level control 19 through line 21 to product storage (not shown). The remaining portion of the withdrawn polymer is circulated by means of pump 22 through a shell and tube type exchanger 24 located in conduit 23. The heating medium is high pressure steam, e.g. about 600 psig, provided in line 26 and its flow is regulated by means of temperature control valve 27. Hot oil could also be used as the heating medium.

There are several advantages of the process of this invention. Among these are:
(1) It provides a simple yet extremely efficient method of vaporization and subsequent separation of unreacted monomers from the polymer product.
(2) It enables trouble free flow of pumpable product through-out the entire process equipment, i.e. from the outlet of the reactor, through the separation equipment and finally to product storage or to heated vehicles used to transport the final product to the user.

It is to be understood that many alterations and modifications can be made to the process of this invention. All such departures are considered within the scope of this invention and defined by the specification and appended claims.

What is claimed for:

1. A process for the production of a polyalphaolefin in fluid form which comprises:
   (a) withdrawing from a bulk polymerization zone maintained at a temperature between about 130° F. and about 175° F. and at a pressure between about 400 psig and about 550 psig through a valve a reactor effluent comprised of amorphous polyalphaolefin and liquid unreacted monomer;
   (b) directly contacting said effluent immediately upon withdrawal through said valve with a heated devaporized amorphous polyalphaolefin obtained in step (f) below and having a temperature in the range from about 350° F. to about 425° F.;
   (c) passing the resulting mixture from step (b) to a flash zone maintained at a pressure from about 40 to about 80 psig and a temperature between about 300° F. and about 375° F.;
   (d) withdrawing a vapor stream of unreacted monomer from said flash zone;
   (e) withdrawing devaporized amorphous polyalphaolefin from said flash zone;
   (f) heating a portion of said devaporized polyalphaolefin from step (e) by indirect heat exchange and passing the heated portion to step (b) above, and
   (g) recovering the remaining portion of said devaporized polyalphaolefin from Step (e) as the product of the process.

2. The process of claim 1, wherein the weight ratio of the heated devaporized polymer in step (b) to the amorphous polyalphaolefin withdrawn in step (a) ranges between about 10:1 and about 15:1.

3. The process of claim 1 wherein the amorphous polyalphaolefin is a propylene-based polymer selected from the group consisting of amorphous propylene homopolymer, amorphous copolymers of propylene and ethylene and amorphous interpolymers of propylene, ethylene and another alpha-olefin having from 4 to 8 carbon atoms per molecule.

* * * * *